Sept. 1, 1964 J. R. BEDELL ETAL 3,147,167

METHOD OF PRODUCING ELECTRICAL COMPONENTS

Filed Jan. 17, 1962

INVENTORS
JOHN R. BEDELL
VALENTIN TSONEV
BY
Morgan, Finnegan, Durham & Pine
ATTORNEYS United States Patent Office 3,147,167
Patented Sept. 1, 1964

3,147,167

METHOD OF PRODUCING ELECTRICAL COMPONENTS

John R. Bedell, Smithtown, and Valentin Tsonev, Glen Cove, N.Y., assignors, by mesne assignments, to Day Company, N.V., a Curacao corporation Filed Jan. 17, 1962, Ser. No. 166,903
4 Claims. (Cl. 156—264)

This invention relates to methods for producing electrical components and assemblies thereof, including assemblies heretofore made by printed circuit techniques, and more particularly to multiple stage metal working methods for forming such components and assemblies.

In the prior copending application of J. Beste for Method of Producing Electrical Components, Serial No. 66,997, filed November 3, 1960, there is disclosed a process which includes the partial formation (as by coining) of the desired circuit configuration in a conductive material, for example a copper blank, with a residual structure or web being retained to facilitate handling and assembly; this web is subsequently dissolved away as by etching.

The present invention is related to this process, has corresponding objects, and contemplates a supplementing of the coining process described in said copending application with a shearing or abrading operation whereby the web is separated from the desired circuit configuration to thus leave the elements thereof separated by dielectric regions.

To illustrate the practices of the invention, the production of rotors for electro-mechanical components will be described.

Thus a further specific object of the invention is to provide a novel process for forming rotor components for dynamic electrical equipment such as motors, rotary switches, synchros, shaft-to-digital converters and the like.

Other objects and advantages of the invention will be set forth in part hereinafter and in part will be obvious herefrom or may be learned by practice with the invention, the same being realized and attained by means of the instrumentalities pointed out in the appended claims.

The invention consists in the novel steps, methods, combinations and improvements herein shown and described.

Serving as exemplary illustrations of the procedures according to the invention are the drawings of which:

Figure 1:
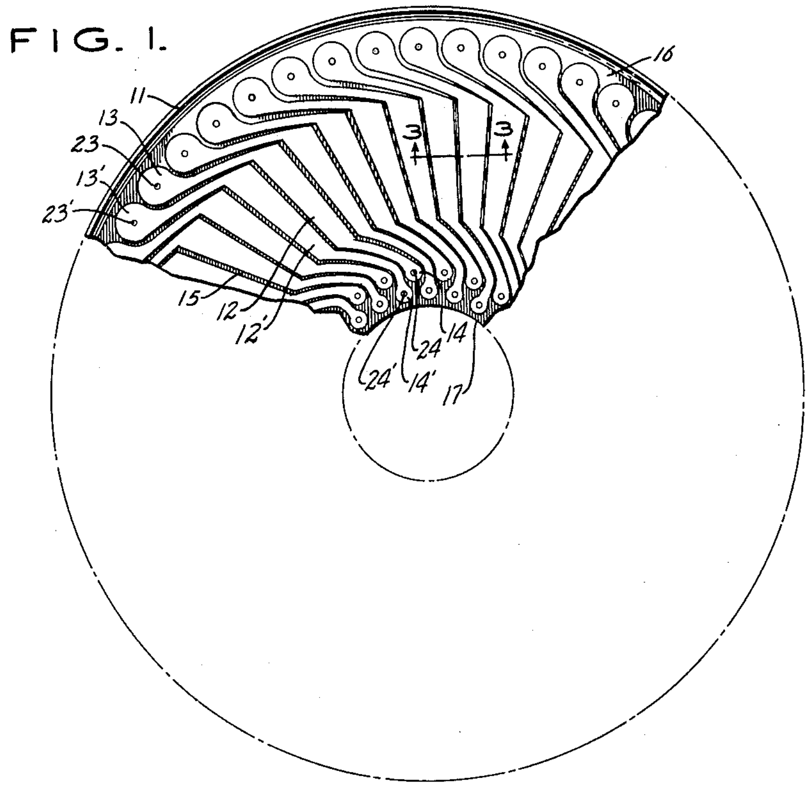
FIGURE 1 is a plan view partly schematic illustrating a partially formed electrical motor rotor.

As illustrated in FIGURE 1, a rotor produced according to the invention comprises a plurality of generally radial rotor segments 12 and 12' arranged adjacent one another to form a generally disk-shaped configuration. Each segment 12 includes external terminal section 13 and internal terminal section 14, conveniently provided with apertures 23 and 24, respectively. In similar manner the adjacent segment 12' is provided with external terminal section 13' and internal terminal section 14', having holes

23' and 24', respectively. To provide for economy of space and materials the terminal sections 14 of segments 12 extend to a lesser degree towards the center of the rotor than do the adjacent terminal sections 14' of segments 12'. Rotors of this general type are disclosed in application Serial No. 792,733, filed February 12, 1959, now U.S. Patent No. 2,970,238.

Figure 2:
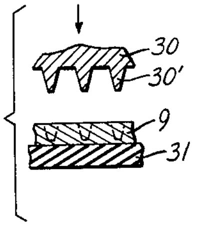
FIGURE 2 is an elevation fragmentary view in cross-section illustrating an initial stage of the process wherein a conductive material or blank is subjected to pressure applied by way of a coining die.

The circuit configuration comprising the above-described plurality of conductive segments is formed from a conductive material 9, FIGURE 2, which may initially be in the form of a sheet of stock. When the blank 9 has been processed as described hereinafter, the resultant product has the appearance illustrated in FIGURE 1 with the conductive regions, e.g., segments, being formed in relief against a reduced thickness background which characterizes the regions 15 (between adjacent segments), the central region 17 (bounded by the terminals 14, 14') and the peripheral region 16 (between the terminal sections 13, 13' and the external border 11). Also of reduced thickness are the regions corresponding with the holes 23, 23', 24 and 24'.

For producing the rotor component of FIGURE 1, a coining operation illustrated in FIGURE 2 is preferably employed. In the coining operation, the blank 9 of conductive material such as copper is subjected to the action of a coining die 30, 31 operated by a press not shown. Under the die pressure, the projections 30' impress the grooves 15 into the blank 9 thereby forming in relief and outlining or delineating, conductive segments 12 and 12' against a residual background or web structure 18.

The sections 15 as well as the other reduced sections 16, 17, etc., of the web 18 correspond with the non-conductive or dielectric sections of the circuit, and these accordingly are removed prior to completion of the rotor.

Figure 3:
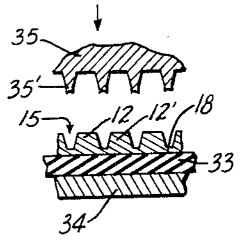
FIGURE 3 is an elevation fragmentary view in cross-section, taken along the lines 3—3 of FIGURE 1, illustrating a section of the rotor after the coining operation and illustrating the set up for a subsequent shearing operation.

In addition to the coining operation, the rotor disk is subjected to shearing action. This is preferably effected (FIGURE 3) by backing the coined rotor with yieldable material 33, backed in turn by a platen 34, and by applying a mechanical force, preferably selectively, as by way of die 35. The force is of sufficient magnitude to shear the dielectric assigned regions 18 thus separating the same from the circuit components 12, 12'.

Figure 4:
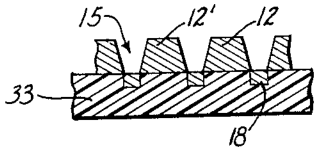
FIGURE 4 is an elevation fragmentary view in cross-section of the rotor as it may appear after a shearing operation.

The backing 33 is preferably adhered to the rotor disk and yields sufficiently to incorporate the sheared regions 18 therein as seen in FIGURE 4 while still retaining the circuit components 12, 12' in prescribed orientation.

To promote the shearing action the projections 35' of the die 30 may have beveled edges formed for example by making the faces of projections 35' concave.

After the operations as aforesaid, two rotor disks thus processed are placed with their faces opposing against opposite sides of an insulator 20 and preferably secured thereto with the opposing disks registered to form pluralities of conductor pairs which will ultimately be joined together to form the complete rotor. Other steps may also be performed at this time, or in conjunction with the coining operation, including the trimming away of surplus stock and the forming of center section 17.

Figure 5:
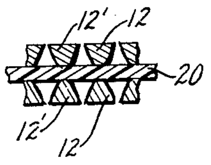
FIGURES 5 and 6 are elevation fragmentary views partly in section illustrating subsequent stages of the process of producing a rotor according to the invention.

To remove the sheared web sections, backing 33 is stripped from each disk leaving the rotor in the condition illustrated in FIGURE 5.

Figure 6:
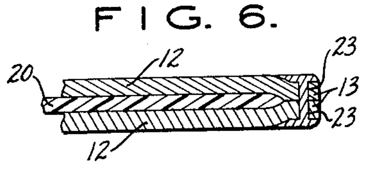

In addition to removal of the dielectric-assigned portions of the disks, the segments of one disk are connected to electrically associated segments of the opposite disk to complete the rotor circuits. This may be conveniently accomplished in a number of ways, for example by plating through holes 23, 23', 24, and 24', as illustrated in FIGURE 6. The plating material as seen in that figure is in electrical contact with the adjoining terminal sections 13, passing through the coaxial holes 23 in each section. The same procedure is applied with respect to the adjacent terminal sections 13' and the internal terminal sections 14 and 14'.

In manufacturing rotors or other circuits according to the invention, one or more of the metal working operations may be accomplished in a number of successive steps, each of which forms a portion of the circuit configuration in the conductive blank, this procedure being followed until the total circuit is formed.

It may be seen from the above that the techniques of the invention greatly facilitate the production of electrical components and assemblies. The coining and shearing operations lend themselves readily to mass production and are adaptable to the working of relatively thick stock. The need for etching with its attendant requirements is eliminated.

The invention in its broader aspects is not limited to the specific steps, methods, combinations and improvements shown and described but departures may be made therefrom within the scope of the accompanying claims without departing from the principles of the invention and without sacrificing its chief advantages.

What is claimed is:

1. A process for the production of a multi-conductor rotor for electrical apparatus comprising the steps of coining a conductive blank in die means to form said conductors with a residual bridging structure therebetween, applying a mechanical force to said bridging structure for separating said bridging structure from said conductors while providing a support for maintaining said conductors in prescribed arrangement, joining two of said conductor arrangements face to face with insulation therebetween and electrically interconnecting said two conductor arrangements.

2. A process according to claim 1 in which said support is provided by yieldable means, in which said force is applied to impress said separated bridge structure in said yieldable means and in which said yieldable means thus impressed is removed from each said conductor arrangement subsequent to the joining of said arrangements.

3. The process according to claim 1 in which said mechanical force comprises a shearing force.

4. The process according to claim 3 in which said shearing force is of a magnitude to substantially fully displace said bridging structure into said support.

References Cited in the file of this patent

UNITED STATES PATENTS

| | | |
|---|---|---|
| 2,427,144 | Jansen | Sept. 9, 1947 |
| 2,772,501 | Malcolm | Dec. 4, 1956 |
| 2,781,849 | Bladergroen et al. | Feb. 19, 1957 |
| 2,898,521 | Creveling | Aug. 4, 1959 |
| 2,937,358 | Bulger | May 17, 1960 |
| 2,990,310 | Chan | June 27, 1961 |

OTHER REFERENCES

I.B.M. Technical Disclosure Bulletin (E. D. Miles), "Flush Printed Circuits," vol. 1, Nov. 2, August, 1958.